United States Patent [19]

Jeng et al.

[11] Patent Number: 4,965,458
[45] Date of Patent: Oct. 23, 1990

[54] APPARATUS FOR TRANSLATING ORACLE-BONE SCRIPTURE INTO A MORE FORMAL LANGUAGE

[75] Inventors: Bor-Shenn Jeng; Gan-How Chang; Kuang-Yao Chang; Jsann-Shyong Liu; Jangkeng Lin; Jei-Shoung Hwang; T-Min Wu; Keh-Hwa Shyu; Char-Hin Miou; Luke Can, all of Tao Yuan Hsien, Taiwan

[73] Assignee: Telecommunication Laboratories, Directorate General of Telecommunications, Ministry of Communications, Taiwan

[21] Appl. No.: 230,754

[22] Filed: Aug. 10, 1988

[51] Int. Cl.$^5$ .............................................. G06F 15/38
[52] U.S. Cl. .................................... 364/419; 364/200
[58] Field of Search ................................ 364/419, 200

[56] References Cited

PUBLICATIONS

"Oracle Bones and Mandarin Tones: Demystifying the Chinese Language", Project on East Asian Studies in Education, Michigan University, Ann Arbor, 1979 Abstract; (Citation From Eric File of Microsearch, AN ED 2114017).

Primary Examiner—Michael R. Fleming
Assistant Examiner—Gail O. Hayes
Attorney, Agent, or Firm—Wenderoth, Lind and Ponack

[57] ABSTRACT

An apparatus for translating oracle-bone scripture style characters into formal style characters, and for translating formal style characters into oracle-bone scripture style characters includes a scanner for scanning printed characters and for providing a digital representation of the thus scanned printer characters. The printed characters are one of either the oracle-bone scripture style characters or the formal style characters. An oracle-bone scripture style and formal style character stroke feature analysis and learning unit is provided for extracting a feature of each scanned printed character, and for storing into an oracle-bone scripture style and formal style feature space storage device the thus extracted features of each scanned printed character according to a learning and analysis process. An oracle-bone scripture style and formal style character translation subsystem is provided for translating the scanned printed characters in accordance with the extracted features stored in the oracle-bone scripture style and formal style feature space storage device. A character output generator is provided having incorporated therein a character compressor, the character output generator for generating output characters and said character compressor for reducing a required memory space for storage of said characters. A processor is provided for controlling the scanner, the oracle-bone scripture style and formal style character stroke feature analysis and learning subsystem, the oracle-bone scripture style and formal style feature space storage device, the oracle-bone scripture style and formal style character translation subsystem, and the character compressor.

5 Claims, 9 Drawing Sheets

FIG. 8-1
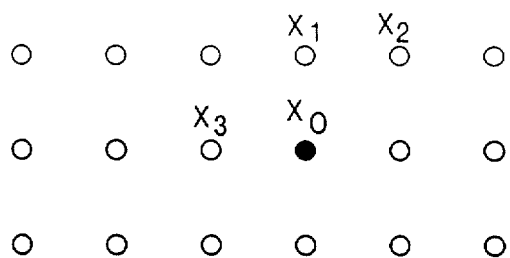
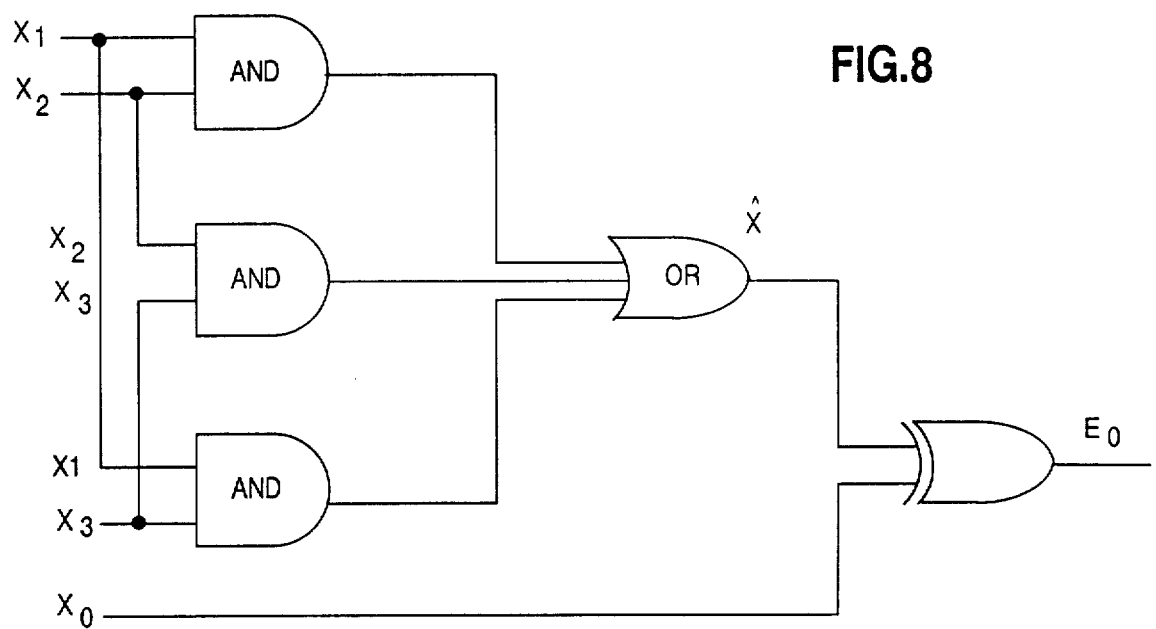
FIG. 8

FIG. 9-1

| 一 | 一 | = | 二 | 十 | 七 | • | 丁 | ≡ | 三 |
|---|---|---|---|---|---|---|---|---|---|
| = | 上 | = | 下 | 丂 | 于 | ╎ | 丁 | X | 五 |
| 亼 | 不 | ᄃ | 云 | ✳ | 井 | ᄀ | 丑 | 刂 | 丐 |
| 且 | 且 | 冂 | 丙 | ⛰ | 丘 | 而 | 而 | 至 | 至 |
| 夫 | 夷 | ᄋ | 百 | ᄊ | 丞 | 工 | 互 | 司 | 亘 |

APPARATUS FOR TRANSLATING ORACLE-BONE SCRIPTURE INTO A MORE FORMAL LANGUAGE

BACKGROUND OF THE INVENTION

Since oracle-bone scripture is one of the oldest written languages in China, few people other than experts can understand and interpret such scripture. As the famous scholar in the field of oracle-bone scripture, Dr. Tung Tso-Pin once said, "it is not only [required] to study the characters of oracle-bone scripture but also to research the history three thousand years before in the Shan Dynasty from the scripture left that was engraved after writing by those great historians (Chen People) in ancient China". It is a major object of the present invention to use advanced technology to enable people to discover the historical secrets of pre-historic China and to learn the roots of ancient Chinese culture.

SUMMARY OF THE INVENTION

The objects and features of the present invention include those enumerated below.

1. By use of the present invention, it is very simple to print out related oracle-bone scripture characters and Ming-style characters by inputting standard script. Therefore, with the assistance of the present invention, those who do not understand oracle-bone scripture can learn the meaning of any oracle-bone scripture character and can further learn to write standard script in oracle-bone characters. Furthermore, the present invention is also applicable for translating two different types of writings, for example, for translating a complicated form of characters into a simplified form of characters.

2. High speed processing. The translation and printing of oracle-bone scripture to formal-style characters and of formal-style characters to oracle-bone scripture is completed at a speed of 200 characters per minute.

3. When recognizing a formal-style character, one set of oracle-bone scripture characters corresponding to different time periods will be printed out for reference. For instance, if the character " 月 " is input, the corresponding oracle-bone scripture characters " D ", " ₵ ", " ▷ ", and " ℂ " will be printed out since the oracle-bone scripture characters vary according to the historical time period.

4. Upon printing, after recognition of oracle-bone scripture, one set of formal-style characters setting forth a further meaning will be printed out with the accompanying corresponding formal-style character. For example, upon input of the oracle-bone scripture character " ₵ ", the main character " 月 " and the graphic variance of this character " ▷ " and " ⋗ " will all be printed out for reference.

5. Because some oracle-bone scripture characters are unrecognizable or have no corresponding modern written word equivalents, the present invention provides an indication as to what modern writing language characters do not exist in oracle-bone scripture and as to what oracle-bone scripture characters are not recognizable. The present invention includes means for storing more than two thousand oracle-bone scripture characters, among which only one thousand and more are recognizable. Furthermore, the present invention can recognize more than five thousand characters in modern written form, among which only one thousand and more can be translated to corresponding oracle-bone scripture characters. The present invention includes a means for indicating which modern writing form not available in oracle-bone scripture.

6. The present invention can translate and print oracle-bone scripture characters and formal-style characters of any size. Any literature which has been enlarged or reduced is applicable in the present invention for translation.

7. Simplification of operation. Any paper or any book is applicable for translation by the present invention. No special training is necessary for operation. The present invention is very useful for oracle-bone scripture experts as well as for the novice beginning to learn oracle-bone scripture.

8. High accuracy and performance. The accuracy rate of recognition is more than 99.9%.

9. The present invention is an intelligent system. The present invention includes self-learning capability through a fixed form of words arranged in proper sequence. For example, when the present invention has determined the form of a standard script of modern written language in oracle-bone scripture, if two or more other forms of the preferred formal-style form are available, the present invention can determine and store all the available forms for accurate translation.

10. By means of a learning system in the present invention, the number of characters can be expanded when any of the once unrecognizable oracle-bone scripture characters is recognized. (At present, twelve hundred recognizable oracle-bone scripture characters can be stored, with seven hundred and more oracle-bone scripture characters still pending for investigation and recognition).

11. The present invention is also applicable for statistical analysis of oracle-bone scripture characters. The present invention is the first translator available in the world for translation of oracle-bone scripture. The present invention is very helpful for learning the history of ancient China and for discovering the secrets of ancient Chinese culture, as well as for enhancing and glorifying the cultural property left behind by ancient Chinese people.

BRIEF DESCRIPTION OF THE DRAWINGS

FIG. 8 is a hardware structure drawing of an oracle-bone scripture two dimensional character predicting coder, according to the present invention.

FIG. 8-1 is an illustration of oracle-bone scripture two dimensional character predicting points, according to the present invention.

FIG. 9 is an illustration of sample characters of oracle-bone scripture, formal-style form and Ming-style form printed through the present invention.

FIG. 9-1 is an illustration of sample characters of formal-style form printed by the present invention and translated from oracle-bone scripture.

DETAILED DESCRIPTION OF THE PREFERRED EMBODIMENT

Oracle-bone scripture is one of the of the oldest written languages in China. Generally, it is a script engraved with a knife by great historians in the Shan Dynasty. Oracle-bone scripture was discovered at the end of Ching Dynasty and at the beginning of Ming-Kuo thousands of years later. As Dr. Tung Tso-Ping once said during his later years, "The study of oracle-bone scripture by means of scientific methods has not yet started". The present invention is provided for making use of advanced technology to assist in the study of ancient human culture.

Figure 1:
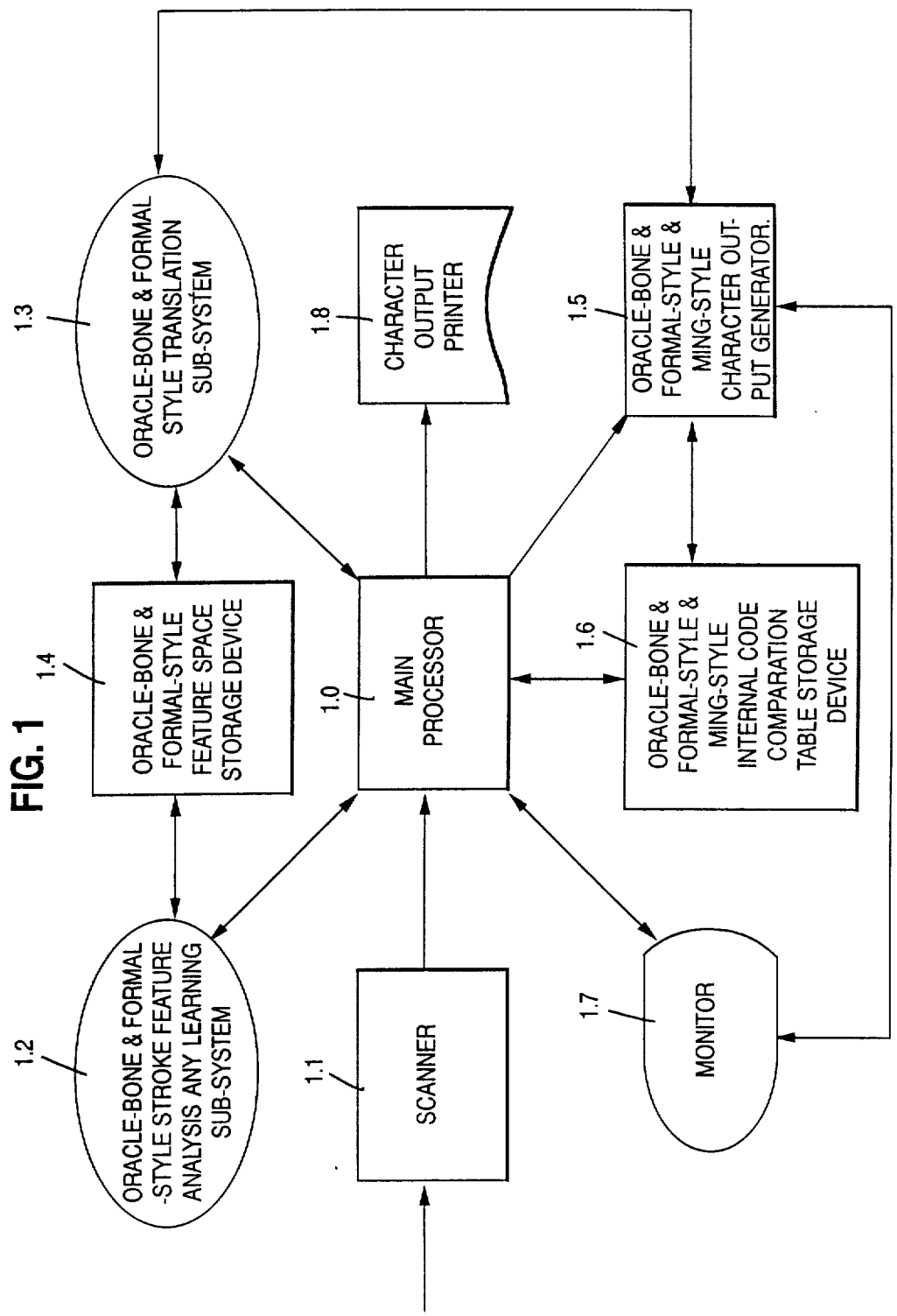
FIG. 1 is a system structural drawing of a oracle-bone scripture translator according to the present invention.

Please now refer to FIG. 1. The system of the present invention is composed of a main processor 1.0, a scanner 1.1, an oracle-bone scripture and formal-style character stroke feature analysis and learning subsystem 1.2, an oracle-bone scripture and formal-style translation subsystem 1.3, an oracle-bone scripture and formal-style feature space storage device 1.4, an oracle-bone scripture, formal-style, and Ming style character output generator 1.5, an oracle-bone scripture, formal-style, and Ming style internal code comparative table storage device 1.6, a monitor 1.7, and a character output printer 1.8.

The main processor 1.0 is for controlling the execution of each module in the system.

The scanner 1.1 is for converting a letter printed on paper to digital data for processing.

Figure 2:
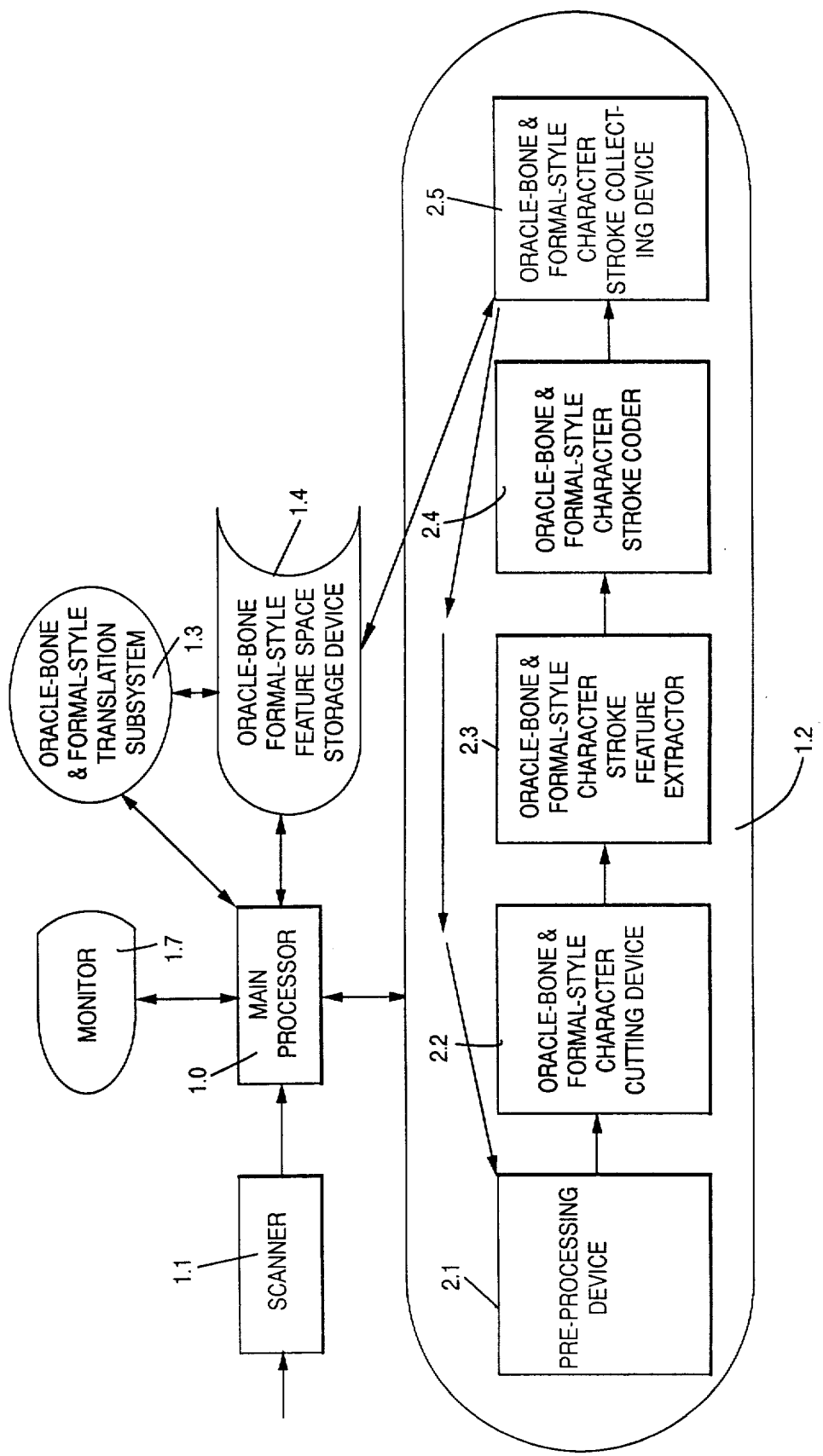
FIG. 2 is an illustration of an oracle-bone scripture and formal-style character stroke feature analysis and learning subsystem.

The oracle-bone scripture and formal-style character stroke feature analysis and learning subsystem 1.2 is shown in more detail in FIG. 2. This subsystem 1.2 is used to extract the feature of every character of the oracle-bone scripture of the formal-style character to be translated, through learning and analysis, and to store into the oracle-bone scripture and formal-style feature space storage device 1.4 for further comparison.

The respective functions of each module in this feature analysis and learning subsystem 1.2 is as described hereinafter:

The preprocessing device 2.1 clears the impurities around the character using a filter and smooths the character by filling in vacancies and clearing out extruding points, and then normalizes the size and position of the character to obtain a complete and clear character.

The oracle-bone scripture and formal-style character cutting device 2..2 operates to search each character and to cut each character for extraction and analysis.

Figure 3:
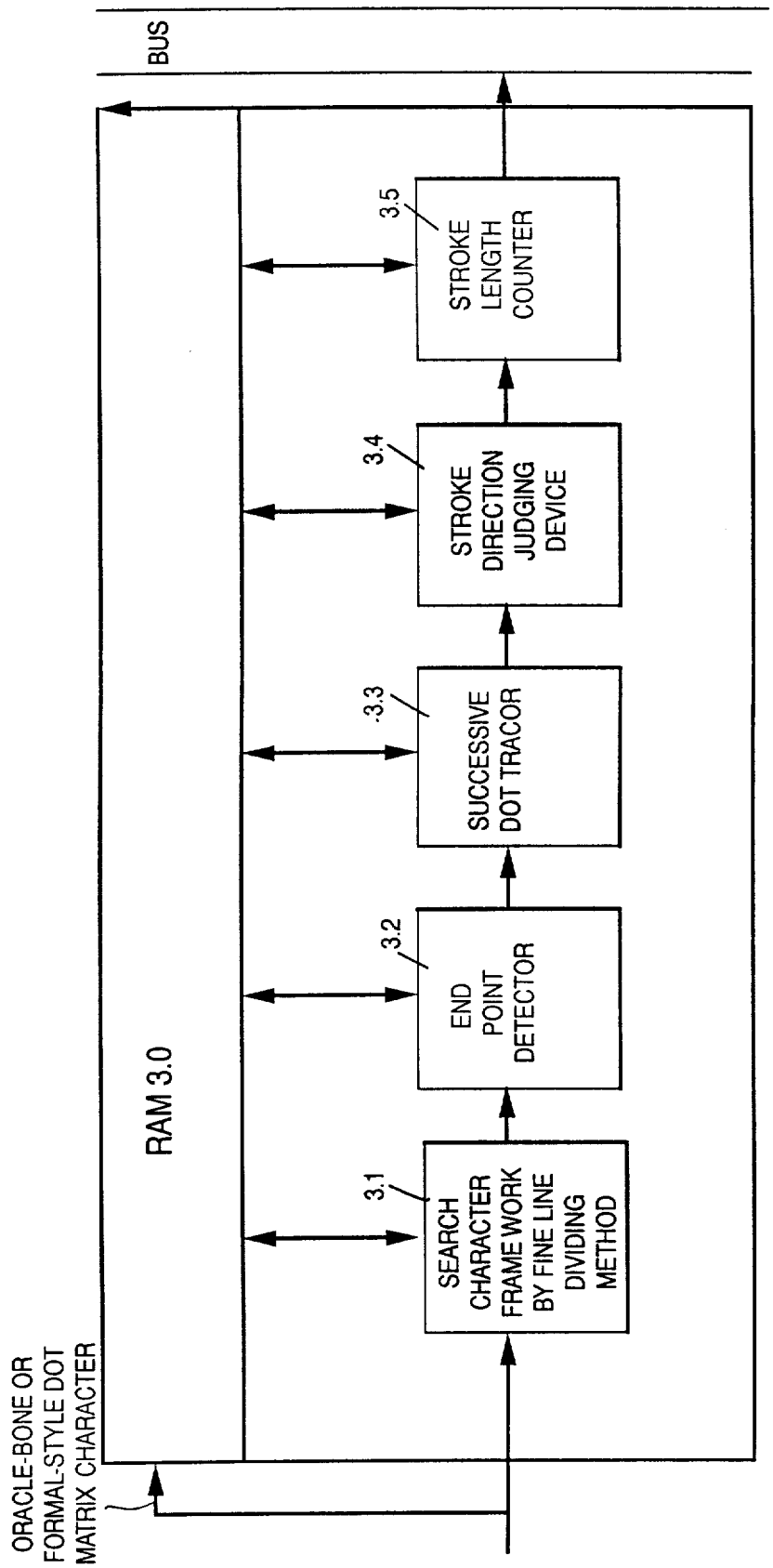
FIG. 3 is an allocation chart of the hardware structure of the extension board of the oracle-bone scripture and formal-style character stroke extractor according to the present invention.

The oracle-bone scripture and formal-style character stroke feature extractor 2.3 operates as follows: Chinese characters in oracle-bone scripture were originated from drawings, through strokes to hieroglyphics after a long period of evolution. Therefore, the extraction of a stroke feature for translation is in compliance with the basic principles of creating the oracle-bone scripture character. However, the method of character stroke recognition currently applied with respect to modern written language is not applicable for recognizing the character strokes of oracle-bone scripture. In the present invention, the character stroke feature extraction is processed through the hardware as illustrated in FIG. 3. When an oracle-bone scripture of formal-style character dot matrix is input into the RAM 3.0, the character framework is searched by fine line dividing method 3.1, then the end point (origin or terminal) detector 3.2 is used to find all end points, and then from one end point successive dots are traced by a tracer 3.3, through the stroke direction judging device 3.4 and the stroke length counter 3.5. If the successive dots deflect over a limited range and the length of the deflection is over a critical value, the successive dots before deflection are considered as being a stroke, and another stroke is counted from the point of deflection. By means of this tracing process, all the successive dots are trace to another end point. When tracing on all end points of a character framework is completed, the strokes of the entire character are obtained. During tracing, when a cross point is encountered, the route of less deflection is a traced priority and the starting point of the route to be traced is regarded as another end point.. For the process mentioned above, including fine line dividing, end point detection, successive dot tracing, and counting of direction and length, we apply an Extension Board to a regular integrated circuit speed up feature extraction.

The oracle-bone scripture and formal-style character stroke feature coder 2.4 proceeds with the digital coding process according to the direction and length of each stroke and registers the coding result into respective feature space. The principle of the coding process is to place strokes of differing length and direction at a different memory for accumulation so as to allow the present system to correctly translate any learned character that has different character stroke feature.

The oracle-bone scripture and formal-style character stroke collating device 2.5 makes use of Logic OR Gate circuitry to collate the features registered in respective oracle-bone scripture and formal-style character feature spaces and to store the collated features in the feature space storage device 1.4. Since the feature space storage has accumulation property, the present translator can recognize oracle-bone scripture as well as formal-style characters.

Figure 4:
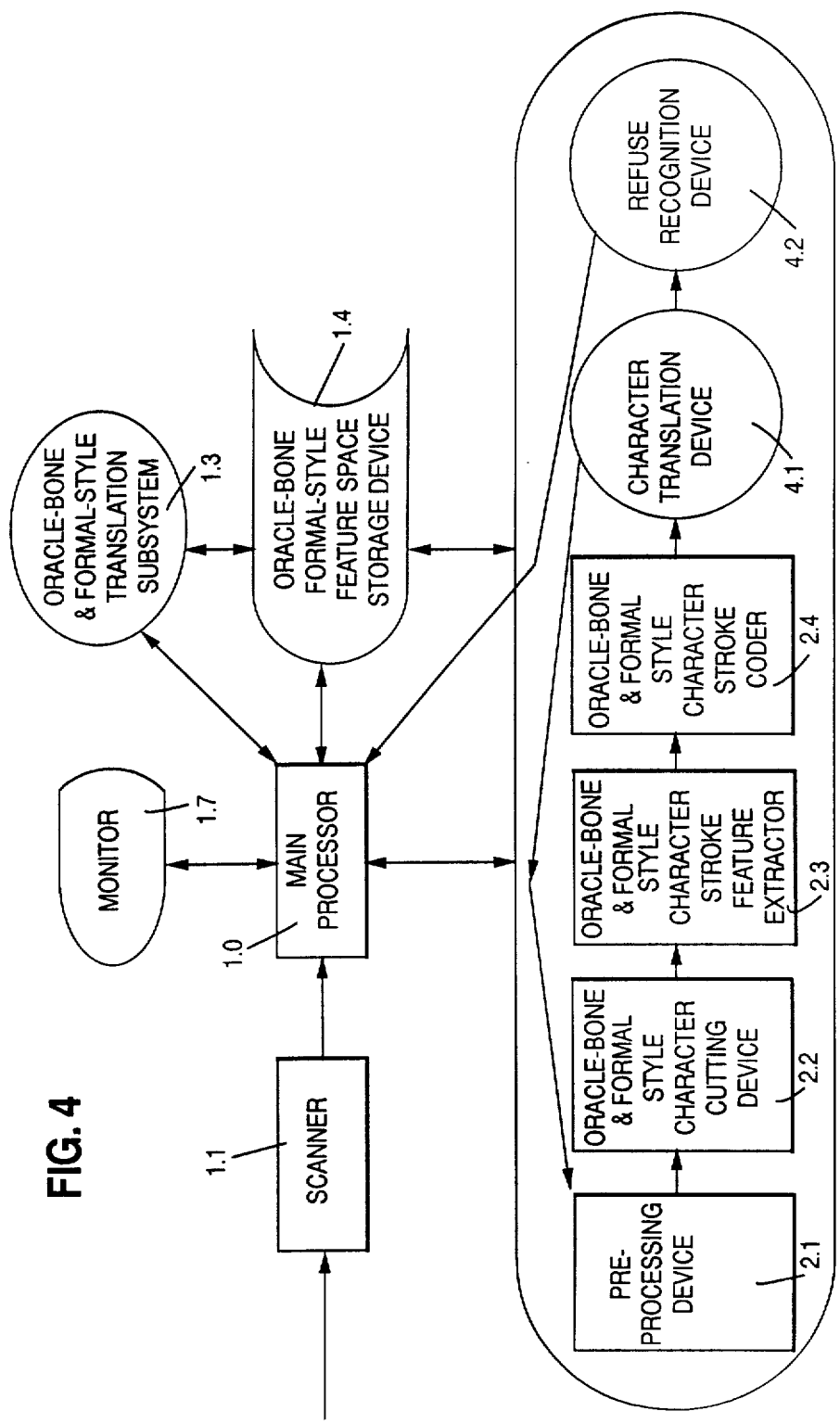
FIG. 4 illustrates an oracle-bone scripture and formal-style character translation sub-system according to the present invention.
Figure 5:
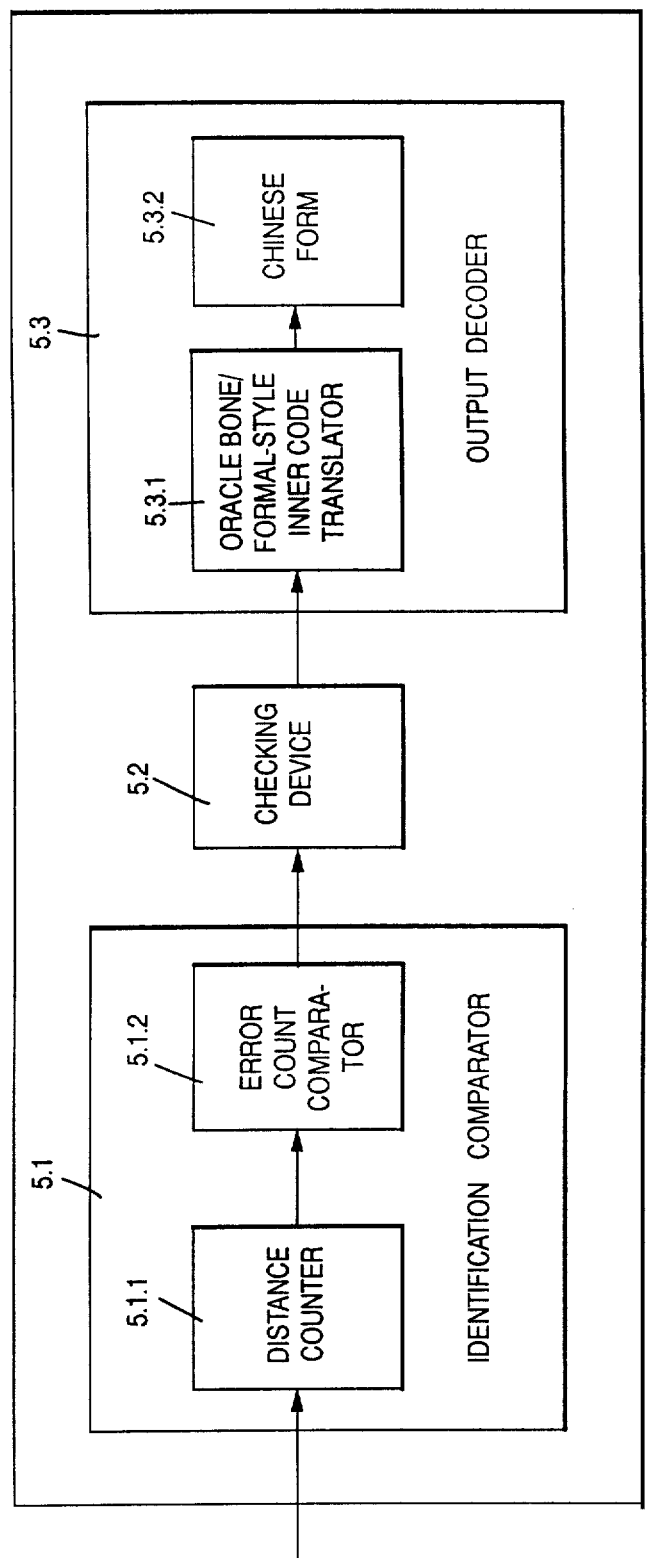
FIG. 5 is an allocation chart of the hardware structure of the oracle-bone scripture/formal-style translation device, according to the present invention.

The oracle-bone scripture and formal-style character translation subsystem 2.3 operates as follows: After the learning procedure, the present invention starts the oracle-bone scripture and formal-style translation procedure. By means of the subsystem shown in FIG. 4, the inputted letters appearing on the paper are translated on a character by character basis. The process is completed via the preprocessing device 2.1 and the oracle-bone scripture and formal-style character cutting device 2.2. The oracle-bone scripture and formal-style stroke feature extractor 2.3, and the oracle-bone scripture and formal-style character stroke feature coder 2.4 are the same as described with respect to the learning subsystem. The character stroke feature code thus obtained is input to the character translation device for translation.

The character translation device 4.1 includes an identification comparator 5.1, a checking device 5.2, and an output decoder 5.3.

The identification comparator is composed of a distance counter 5.1.1 and an error count comparator 5.1.2.

Figure 6:
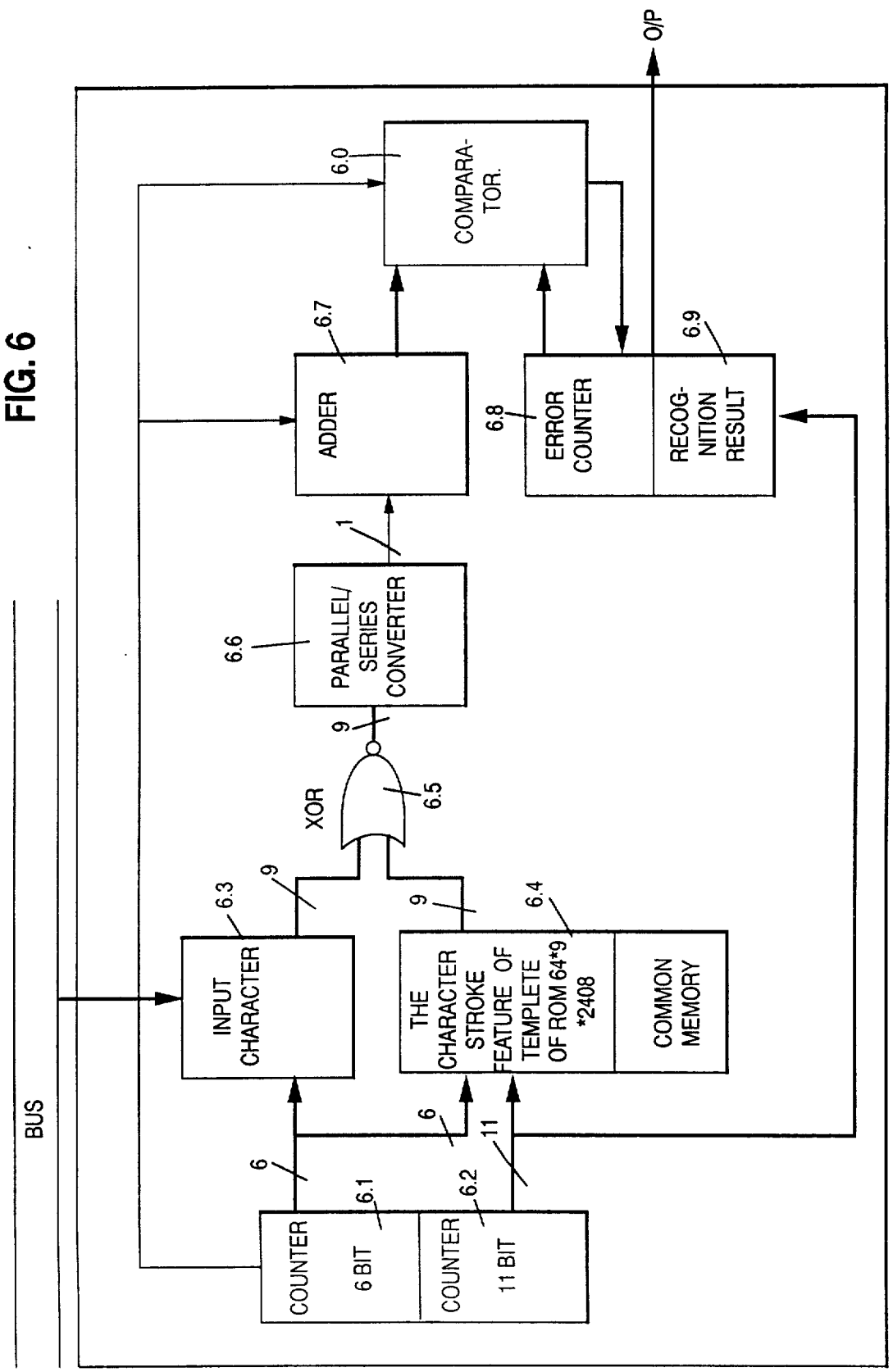
FIG. 6 is an allocation chart of the hardware structure of the oracle-bone scripture and formal-style character identification comparator, according to the present invention.

Reference is made to FIG. 6 regarding the allocation of hardware. Two counters 6.1, 6.2 are used to respectively control the input character stroke feature code (in memory 6.3) and the template's stroke feature code (in memory 6.4) for comparison. At first, the Exclusive OR Gate 6.5 initiates an error count to obtain an accumulated error count through the parallel/serial converter 6.6 and the adder 6.7 for comparison with the error count value in the recorder 6.8 by comparator 6.0. If the accumulated error count value is less than the value in the recorder, the accumulated error count will replace the error count value in the recorder, and the character code will be placed at the recognition result position 6.9 in the recorder. If the accumulated error count value exceeds the value in recorder, the content of the recorder does not change. By means of this process, as soon as the entire counting process is complete, the comparison process is also finished, and the content of the recorder is then transferred to a checking device for final confirmation.

The checking device 5.2 determines if the error count value exceeds a critical value. If the error count does exceed the critical value, the refused recognition device 4.2 takes over the execution. If the error count is less than the critical value, the output decoder 5.3 proceeds with the next step.

The list checking-device 5.3.1 of the output decoder 5.3 checks the list to obtain the internal code required from the oracle-bone scripture, formal-style, and Ming-style internal code comparative table storage device 1.6. The internal code thus obtained is converted into an internal code of the character to be outputted. The converted internal code thus obtained is passed through the output module 5.3.2 and the oracle-bone scripture, formal-style, and Ming-style character generator 1.5 for displaying on the monitor 1.7 or for printing by printer 1.8.

If the error count vale is too excessive, the character in question may not be determined. By means of the refused recognition device 1.2, the character in question can become recognizable by manual determination.

Figure 7:
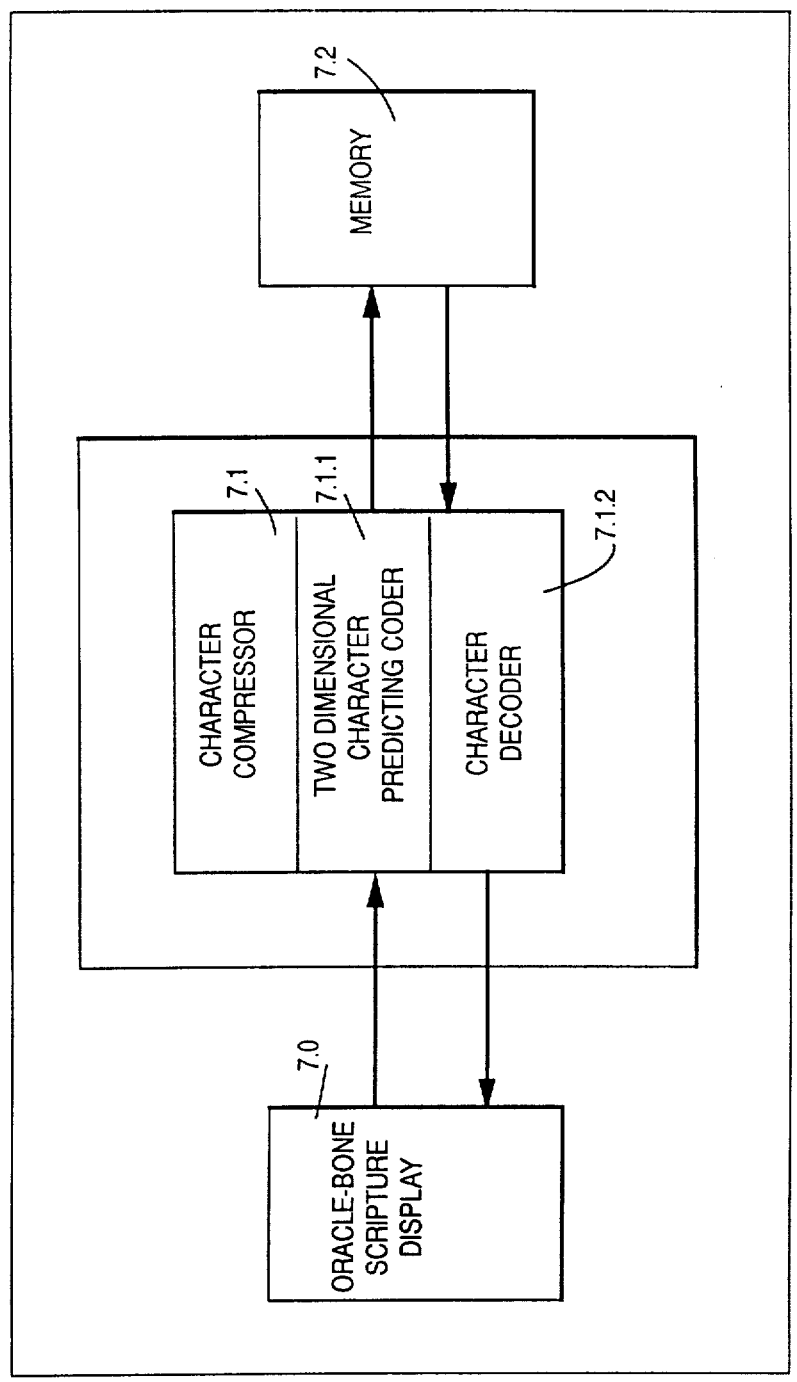
FIG. 7 is an allocation chart of the hardware structure of the oracle-bone scripture character generator, according to the present invention.

A formal-style and Ming-style character generator is currently available in the market. The present invention is for providing an oracle-scripture character generator. Reference is made to the hardware allocation of the oracle-bone scripture character generator as shown in FIG. 7. This generator is composed of a character compressor 7.1 and a memory 7.2 for storage of the compressed oracle-bone scripture character. The compressor is for adjusting memory space. According to the two dimensional feature of oracle-bone scripture, the present invention can include a two dimensional character predicting coder 7.1.1 and a character decoder 7.1.2. Thus, a compressing ration of 85% can be obtained. The predicting coder converts an error series through a predicting function. Reference is made to the hardware structure of the oracle-bone scripture two dimensional character predicting coder as shown in FIG. 8. The prediction of a point X0, it is based upon the three points around X1, X2 and X3.

Reference is now made to FIG. 8-1 for a description of the predicting function according to the present invention:

$\hat{X0} = X1:X2:X3 + X3:X1$, the predicting value of $\hat{X0}$ is X0 and the error count value $E0 = X0 \oplus \hat{X0}$. Thus, the oracle-bone scripture character image {X0} can be converted into error count series {E0}, wherein the E0 value 1 represents a predicting error and 0 represents a correct value. The predicting function applied in the present invention can minimize the probability of error count series "1" and rise the probability of "0" so as to obtain a high compression ratio during the compressing procedure through Modified Read Code. When displaying, the oracle-bone scripture characters produced through the decoding process by means of the present predicting function are of better quality. The Modified Read Code is a standard of the CCITT. FIG. 9 presents a list of sample characters of oracle-bone scripture and Ming-style transliterated from formal-style, or of formal-style transliterated from oracle-bone scripture. As shown in FIG. 9-1, the number of characters determined by and stored in the present invention is about 1,200 characters for oracle-bone scripture and 5,000 characters for formal-style characters.

We claim:

1. An apparatus for translating oracle-bone scripture style characters into formal style characters, and for translating formal style characters into oracle-bone scripture style characters, said apparatus comprising:

a scanner for scanning printed characters and for providing a digital representation of the thus scanned printer characters, the printed characters being one of either the oracle-bone scripture style characters or the formal style characters;

an oracle-bone scripture style and formal style character stroke feature analysis and learning means for extracting a feature of each scanned printed character, and for storing into an oracle-bone scripture style and formal style feature space storage device the thus extracted features of each scanned printed character according to a learning and analysis process;

an oracle-bone scripture style and formal style character translation means for translating the scanned printed characters in accordance with the extracted features stored in said oracle-bone scripture style and formal style feature space storage device;

character output generator having incorporated therein a character compressor, said character output generator for generating output characters and said character compressor for reducing a required memory space for storage of said characters;

a processor means for controlling said scanner, said oracle-bone scripture style and formal style character stroke feature analysis and learning means, said oracle-bone scripture style and formal style feature space storage device, said oracle-bone scripture style and formal style characters translation means, and said character compressor.

2. An apparatus as recited in claim 1, wherein said oracle-bone scripture style and formal style character stroke feature analysis and learning means includes:

an oracle-bone scripture style and formal style character cutting unit;

an oracle-bone scripture style and formal style character stroke feature extractor;

an oracle-bone scripture style and formal style character stroke feature coder, and an oracle-bone scripture style and formal style character stroke collating unit;

wherein a character stroke feature is extracted and coded according to a respective length and direction of the character stroke.

3. An apparatus as recited in claim 2, wherein said oracle-bone scripture style and formal style character stroke feature extractor includes means for searching each terminal of a framework of a character to be translated, and for tracing successive dots from one terminal to determine a definition of a stroke by means of a stroke direction determining unit and a stroke length counter for determining whether a deflection of successive dots exceeds a critical value, wherein the successive dots before deflection are defined as a stroke, and wherein another stroke is counted from a point of deflection.

4. An apparatus as recited in claim 1, including a means for determining and indicating when a character to be translated in unrecognizable according to an error count value.

5. An apparatus as recited in claim 4, wherein said oracle-bone scripture style and formal style character translation means includes an identification comparator, a checking device and an output decoder, said identification comparator including a distance counter and an error count comparator for obtaining a preferred character by comparing a character to be translated with a template character, said output decoder for converting said preferred character into an output internal code for printing by means of said character generator.

* * * * *